US012567898B2

(12) United States Patent
Vuong et al.

(10) Patent No.: US 12,567,898 B2
(45) Date of Patent: Mar. 3, 2026

(54) METHOD AND SYSTEM TO SUPPORT TWO INDEPENDENT DATALINK END SYSTEMS OF SAME TYPE

(71) Applicant: Honeywell International Inc., Charlotte, NC (US)

(72) Inventors: Tsz Lik Eric Vuong, Phoenix, AZ (US); Tavin Cosio, Surprise, AZ (US); Kai Tian, Beijing (CN); Yeming Deng, Beijing (CN); Thomas D. Judd, Phoenix, AZ (US); Anaveerappa Bhimalli, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 380 days.

(21) Appl. No.: 18/179,640

(22) Filed: Mar. 7, 2023

(65) Prior Publication Data

US 2024/0243805 A1 Jul. 18, 2024

(30) Foreign Application Priority Data

Jan. 16, 2023 (IN) .............................. 202311003089

(51) Int. Cl.
*H04B 7/185* (2006.01)
*H04L 69/08* (2022.01)

(52) U.S. Cl.
CPC ......... *H04B 7/18506* (2013.01); *H04L 69/08* (2013.01)

(58) Field of Classification Search
CPC .. H04B 7/18506; H04B 7/18502; H04L 69/08
See application file for complete search history.

(56) References Cited

U.S. PATENT DOCUMENTS

| 7,729,694 B2 | 6/2010 | Bolt, Jr. et al. |
| 8,468,263 B2 * | 6/2013 | Fagan ................ H04B 7/18506 |
| | | 717/173 |

(Continued)

FOREIGN PATENT DOCUMENTS

| CN | 102930748 A | 2/2013 |
| CN | 104683010 A | 6/2015 |

OTHER PUBLICATIONS

ARINC, "Datalink Ground System Standard and Interface Specification (DGSS/IS), ARINC Specification 620-8", Dec. 31, 2014, pp. Cover through 338.

(Continued)

*Primary Examiner* — Lester G Kincaid
(74) *Attorney, Agent, or Firm* — Fogg & Powers LLC

(57) ABSTRACT

A method comprises providing first and second end systems sharing the same A619 origin and destination codes, wherein the first end system has a first A618 label/sublabel, and the second end system has a second A618 label/sublabel different from the first label/sublabel. When an uplink message is an A618 uplink with the first label/sublabel, the method sends an A619 uplink with A619 destination code via a first end system port. If an uplink message is an A618 uplink with the second label/sublabel, the method sends an A619 uplink with A619 destination code via a second end system port. When downlink message is received with the A619 origin code on the first end system port, the method sends an A618 downlink with the first label/sublabel. If downlink message is received with the A619 origin code on the second end system port, the method sends an A618 downlink with the second label/sublabel.

20 Claims, 6 Drawing Sheets

(56)     References Cited

U.S. PATENT DOCUMENTS

| | | | |
|---|---|---|---|
| 9,800,277 B2 | 10/2017 | Sim et al. | |
| 9,887,762 B2 | 2/2018 | Le Bigot et al. | |
| 10,069,843 B2 | 9/2018 | Yerger et al. | |
| 10,798,033 B2 | 10/2020 | Judd et al. | |
| 11,258,863 B1 | 2/2022 | Hochwarth et al. | |
| 2002/0007234 A1* | 1/2002 | Heppe ................ | H04B 7/18506 |
| | | | 701/3 |
| 2003/0158963 A1* | 8/2003 | Sturdy ............... | H04L 12/6418 |
| | | | 709/238 |
| 2006/0080451 A1* | 4/2006 | Eckert ................... | H04L 69/06 |
| | | | 709/230 |
| 2011/0047281 A1* | 2/2011 | Gruyer .............. | H04B 7/18506 |
| | | | 709/230 |
| 2017/0230334 A1* | 8/2017 | Newell ................ | H04W 12/37 |
| 2018/0287971 A1 | 10/2018 | Judd et al. | |
| 2021/0142681 A1 | 5/2021 | Hochwarth et al. | |

OTHER PUBLICATIONS

European Patent Office, "Extended European Search Report", dated May 24, 2024, from EP Application No. 23219728.5 from Foreign Counterpart to U.S. Appl. No. 18/179,640, pp. 1 through 9, Published: EP.

* cited by examiner

100

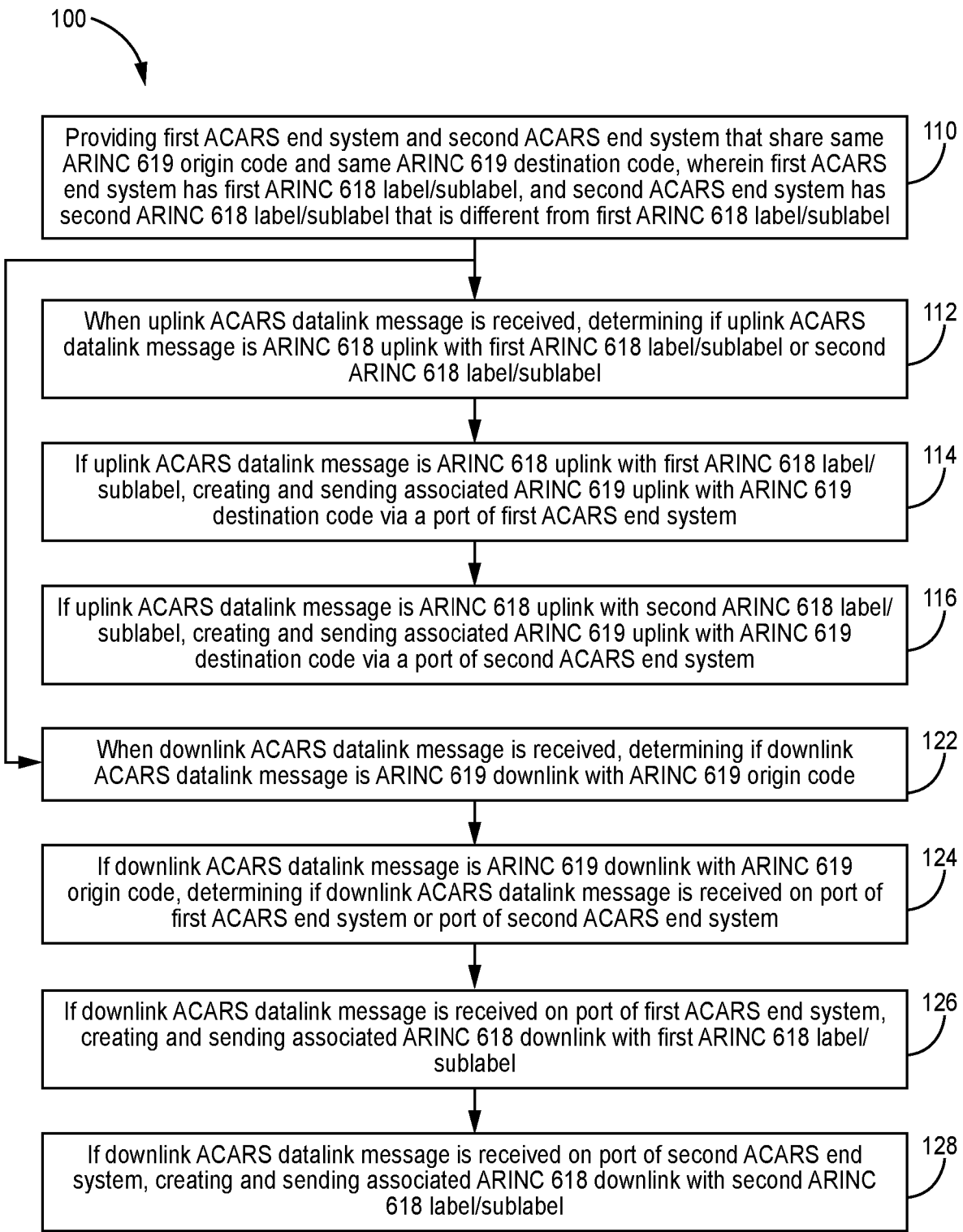

Providing first ACARS end system and second ACARS end system that share same ARINC 619 origin code and same ARINC 619 destination code, wherein first ACARS end system has first ARINC 618 label/sublabel, and second ACARS end system has second ARINC 618 label/sublabel that is different from first ARINC 618 label/sublabel — 110

When uplink ACARS datalink message is received, determining if uplink ACARS datalink message is ARINC 618 uplink with first ARINC 618 label/sublabel or second ARINC 618 label/sublabel — 112

If uplink ACARS datalink message is ARINC 618 uplink with first ARINC 618 label/sublabel, creating and sending associated ARINC 619 uplink with ARINC 619 destination code via a port of first ACARS end system — 114

If uplink ACARS datalink message is ARINC 618 uplink with second ARINC 618 label/sublabel, creating and sending associated ARINC 619 uplink with ARINC 619 destination code via a port of second ACARS end system — 116

When downlink ACARS datalink message is received, determining if downlink ACARS datalink message is ARINC 619 downlink with ARINC 619 origin code — 122

If downlink ACARS datalink message is ARINC 619 downlink with ARINC 619 origin code, determining if downlink ACARS datalink message is received on port of first ACARS end system or port of second ACARS end system — 124

If downlink ACARS datalink message is received on port of first ACARS end system, creating and sending associated ARINC 618 downlink with first ARINC 618 label/sublabel — 126

If downlink ACARS datalink message is received on port of second ACARS end system, creating and sending associated ARINC 618 downlink with second ARINC 618 label/sublabel — 128

FIG. 1

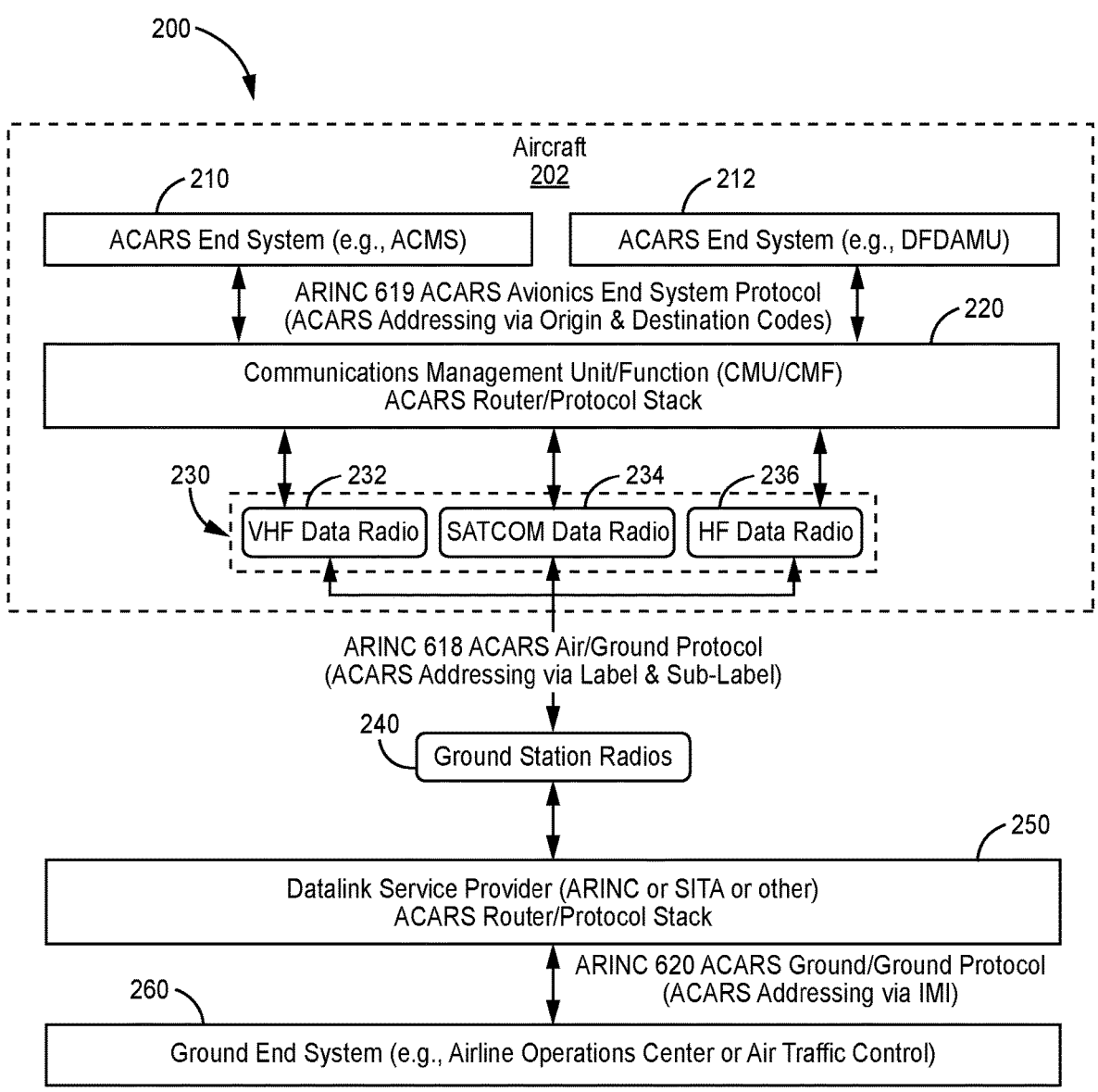

200

Aircraft
202

210

ACARS End System (e.g., ACMS)

212

ACARS End System (e.g., DFDAMU)

ARINC 619 ACARS Avionics End System Protocol
(ACARS Addressing via Origin & Destination Codes)

220

Communications Management Unit/Function (CMU/CMF)
ACARS Router/Protocol Stack

230

232

VHF Data Radio

234

SATCOM Data Radio

236

HF Data Radio

ARINC 618 ACARS Air/Ground Protocol
(ACARS Addressing via Label & Sub-Label)

240

Ground Station Radios

250

Datalink Service Provider (ARINC or SITA or other)
ACARS Router/Protocol Stack

ARINC 620 ACARS Ground/Ground Protocol
(ACARS Addressing via IMI)

260

Ground End System (e.g., Airline Operations Center or Air Traffic Control)

FIG. 2A

METHOD AND SYSTEM TO SUPPORT TWO INDEPENDENT DATALINK END SYSTEMS OF SAME TYPE

CROSS-REFERENCE TO RELATED APPLICATION

This application claims priority to Indian application Ser. No. 202311003089 filed on Jan. 16, 2023, and titled "METHOD AND SYSTEM TO SUPPORT TWO INDE-PENDENT DATALINK END SYSTEMS OF SAME TYPE", the contents of which are incorporated herein in its entirety.

BACKGROUND

Certain aircraft communication platforms are designed for use with separate end systems onboard the aircraft. For example, a digital flight data acquisition management unit (DFDAMU) end system, and a central maintenance com-puter (CMC)/aircraft condition monitoring function (ACMF) end system can be used on a given aircraft con-figuration. Both the DFDAMU end system and the CMC/ACMF end system use the same label/sublabel identification 'H1/DF', as well as the same Aeronautical Radio Inc. (ARINC) 619 origin/destination code 'D'. However, both of these end systems communicate with the communication management function (CMF) software using an ARINC 619 interface with the same or different ARINC 619 protocols. In various implementations, the end systems may interface via an ARINC 429 port, or via a backplane bus, or some other bus. For example, a CMC/ACMF end system can interface with the CMF over a backplane bus.

It has been reported from various airlines that messages from one end system are not being transmitted while another end system is enabled on an aircraft. For example, CMC/ACMF reports are not being transmitted while a DFDAMU is enabled on an aircraft. A similar problem has occurred when a user needs to support end systems like two CMCs and two electronic flight bags (EFBs) using the same ARINC 619 origin code interface.

SUMMARY

A method comprises providing at least a first ACARS end system and a second ACARS end system that share the same ARINC 619 origin code and the same ARINC 619 destina-tion code, wherein the first ACARS end system has a first ARINC 618 label/sublabel, and the second ACARS end system has a second ARINC 618 label/sublabel that is different from the first ARINC 618 label/sublabel. When an uplink ACARS datalink message is received, the method determines if the uplink ACARS datalink message is an ARINC 618 uplink with the first ARINC 618 label/sublabel or the second ARINC 618 second label/sublabel. If the uplink ACARS datalink message is the ARINC 618 uplink with the first ARINC 618 label/sublabel, the method creates and sends an associated ARINC 619 uplink with the shared ARINC 619 destination code via a port of the first ACARS end system. If the uplink ACARS datalink message is the ARINC 618 uplink with the second ARINC 618 label/sublabel, the method creates and sends an associated ARINC 619 uplink with the shared ARINC 619 destination code via a port of the second ACARS end system. When a downlink ACARS datalink message is received, the method deter-mines if the downlink ACARS datalink message is an ARINC 619 downlink received with the shared ARINC 619 origin code. If the downlink ACARS datalink message is an ARINC 619 downlink received with the shared ARINC 619 origin code, the method determines if the downlink ACARS datalink message is received on a port of the first ACARS end system or a port of the second ACARS end system. If the downlink ACARS datalink message is received on the port of the first ACARS end system, the method creates and sends an associated ARINC 618 downlink with the first ARINC 618 label/sublabel. If the downlink ACARS datalink message is received on the port of the second ACARS end system, the method creates and sends an associated ARINC 618 downlink with the second ARINC 618 label/sublabel.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIG. 1 is a flow diagram of a method for supporting two ARINC 619 independent datalink end systems of the same type, which share the same ARINC 619 origin/destination codes, according to one implementation;

FIG. 2A is a block diagram of a datalink communication system, according to an example embodiment;

DETAILED DESCRIPTION

Figure 2B:
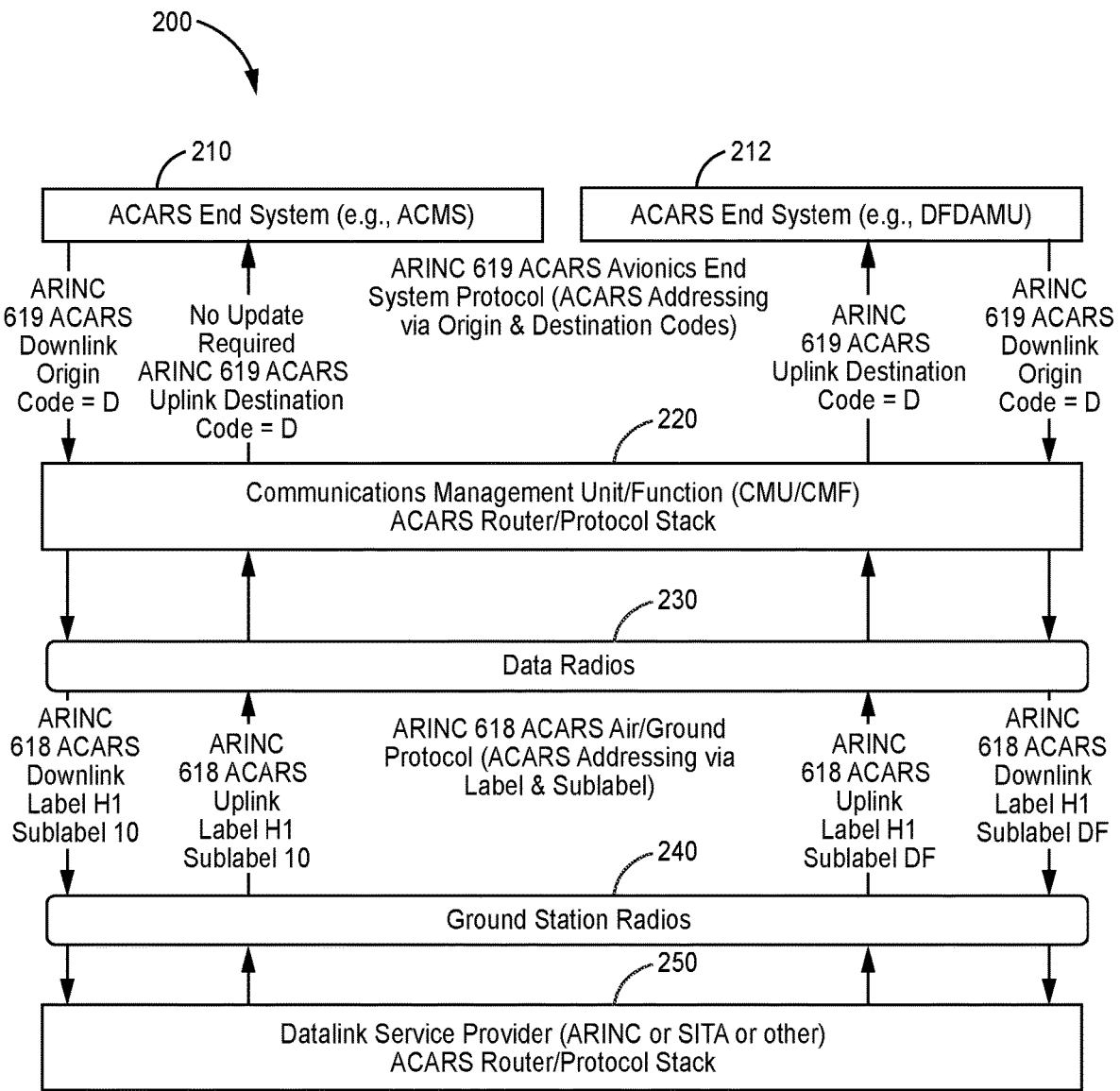
FIG. 2B is a block diagram of a portion of the datalink communication system of FIG. 2A, which shows datalink message flow for uplink and downlink messages, according to an example implementation.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Methods to support two independent datalink end systems of the same type are described herein. The present methods enhance a communication management function (CMF) or communication management unit (CMU) in an aircraft by simultaneously supporting datalink messages from/to inde-pendent datalink end systems without requiring modification or update of the end systems.

In the present approach, the CMF is adapted to have an internal label/sublabel mapping mechanism based on the end systems installation status. For example, an aircraft condi-tion monitoring function (ACMF) end system, and a digital flight data acquisition management unit (DFDAMU) end system need no changes in their implementation to both be supported by the present approach.

In one embodiment, a ground based software tool (GBST) Airline Modifiable Information (AMI) maintains separate origin codes for both end systems to aid the CMF. For example, when delivered to an end system, the separate origin code is mapped/translated to the expected origin code of the end system. The CMF does the internal mapping of the label/sublabel based on the origin code from the GBST AMI. The CMF still recognizes and delivers downlinks from both end systems with the same origin code 'D'. The CMF still supports uplinks from subnetworks with different sublabels with the same destination code.

The present approach provides various benefits and advantages. This approach provides the benefit that support can be added for two end systems of the same type in the CMF/CMU and on the ground, without having to update the end systems. The present approach can be implemented as a software solution in the CMF or CMU, to make the end systems functional with no changes to the existing hardware interface or software. For example, a no-cost upgrade of simultaneous dual ACMF end systems can be provided, if the CMF has this approach implemented for an aircraft that has one aircraft condition monitoring system (ACMS) end system. The present method also provides uplink capabilities in the CMF interface for the ACMF, which helps future enhancements of the ACMF to receive uplinks. Further, this approach provides seamless operation between dual and single ACMS end systems.

The inventive approach can be applied to future development efforts with similar requirements and conditions. For example, if a user wants to support two central maintenance computers (CMCs) using the same Aeronautical Radio Inc. (ARINC) 619 origin code interface, there is no need for an update.

The present method adds support in the aircraft communications addressing and reporting system (ACARS) router for new end systems with the same type of ARINC 619 origin/destination without having to change the ground system for the original ARINC 619 system, and the new ARINC 619 system can use the same origin/destination code by mapping to a different ARINC 618 label/sublabel.

Further details regarding the present approach are described as follows and with reference to the drawings.

FIG. 1 is a flow diagram of a method 100 for supporting two independent datalink end systems of the same type, according to an exemplary implementation. The method 100 comprises providing at least a first ACARS end system and a second ACARS end system that share the same ARINC 619 origin code and the same ARINC 619 destination code (block 110). The first ACARS end system has a first ARINC 618 label/sublabel, and the second ACARS end system has a second ARINC 618 label/sublabel that is different from the first ARINC 618 label/sublabel. The origin code is used when originating a downlink message, and the destination code is used when receiving an uplink message. Thus, the first and second ACARS end systems use the same origin/destination code of 'D' in this example. In various embodiments, the first and second ACARS end systems can include one or more of an ACMS and DFDAMU, as well as CMCs, EFBs, cabin terminals, flight management computers (FMCs), other ACMS systems, or combinations thereof.

When an uplink ACARS datalink message is received, method 100 determines if the uplink ACARS datalink message is an ARINC 618 uplink with the first ARINC 618 label/sublabel or the second ARINC 618 second label/sublabel (block 112). If the uplink ACARS datalink message is the ARINC 618 uplink with the first ARINC 618 label/sublabel, method 100 creates and sends an associated ARINC 619 uplink with the ARINC 619 destination code via a port of the first ACARS end system (block 114). If the uplink ACARS datalink message is the ARINC 618 uplink with the second ARINC 618 label/sublabel, method 100 creates and sends an associated ARINC 619 uplink with the ARINC 619 destination code via a port of the second ACARS end system (block 116). If method 100 determines that the uplink ACARS datalink message is not an ARINC 618 uplink with the first ARINC 618 label/sublabel or the second ARINC 618 second label/sublabel (at block 112), method 100 performs standard ACARS message processing and routing.

When a downlink ACARS datalink message is received, method 100 determines if the downlink ACARS datalink message is an ARINC 619 downlink received with the ARINC 619 origin code (block 122). If the downlink ACARS datalink message is an ARINC 619 downlink received with the ARINC 619 origin code, method 100 determines if the downlink ACARS datalink message is received on a port of the first ACARS end system or a port of the second ACARS end system (block 124). If the downlink ACARS datalink message is received on the port of the first ACARS end system, method 100 creates and sends an associated ARINC 618 downlink with the first ARINC 618 label/sublabel (block 126). If the downlink ACARS datalink message is received on the port of the second ACARS end system, method 100 creates and sends an associated ARINC 618 downlink with the second ARINC 618 label/sublabel (block 128). If method 100 determines that the downlink ACARS datalink message is not an ARINC 619 downlink received with the ARINC 619 origin code (at block 122), method 100 performs standard ACARS message processing and routing.

FIG. 2A is a block diagram of a datalink communication system 200, according to an example embodiment, which includes two datalink end systems of the same type (e.g., same origin and destination code). The system 200 includes a first ACARS end system 210 (e.g., ACMS) and a second ACARS end system 212 (e.g., DFDAMU), which are onboard an aircraft 202.

An onboard communications management unit/communications management function (CMU/CMF) 220 is in operative communication with first and second ACARS end systems 210, 212, such as through the ARINC 619 Avionics End System Protocol, which provides ACARS addressing via origin and destination codes. ARINC 619 is a standard that covers data transmission protocols over ARINC 429 such as Bit Oriented Protocol (BOP), Character Oriented Protocol (COP), and others, as well as over other data busses such as backplane busses. The CMU/CMF 220 provides an ACARS router/protocol stack.

One or more onboard data radios 230, such as a very high frequency (VHF) data radio 232, a satellite communications (SATCOM) data radio 234, or a high frequency (HF) data radio 236, are in operative communication with CMU/CMF 220. Alternatively, an ACARS over internet protocol (IP) subnetwork can be used as a data radio subnetwork. One or more ground station radios 240 are in operative communication with the one or more onboard data radios 230, such as through the ARINC 618 Air/Ground Protocol, which provides ACARS addressing via label and sublabel.

A datalink service provider 250 (e.g., ARINC, SITA, or others) communicates with the one or more ground station radios 140, and provides an ACARS router/protocol stack. A ground end system 260 (e.g., Airline Operations Center or Air Traffic Control) is in operative communication with the datalink service provider 250, such as through the ARINC 620 ACARS Ground/Ground Protocol, which provides ACARS addressing via IMI.

FIG. 2B is a block diagram illustrating a portion of datalink communication system 200, which shows datalink message flow for uplink and downlink messages according to an example implementation. In this example, first ACARS end system 210 is an ACMS, and second ACARS end system 212 is a DFDAMU. As shown in FIG. 2B, first ACARS end system 210 and second ACARS end system 212 share the same ARINC 619 origin codes (e.g., 'D') and the same ARINC 619 destination codes (e.g., 'D'). In addition, first ACARS end system 210 has a first ARINC 618 label/sublabel (e.g., 'H1/10'), and second ACARS end system 212 has a second ARINC 618 label/sublabel (e.g., 'H1/DF').

When an uplink ACARS datalink message is sent from one or more ground station radios 240 to one or more onboard data radio 230 via datalink service provider 250, CMU/CMF 220 determines if the uplink ACARS datalink message is an ARINC 618 uplink with the first ARINC 618 label/sublabel (e.g., 'H1/10') or the second ARINC 618 label/sublabel (e.g., 'H1/DF'). If the uplink ACARS datalink message is the ARINC 618 uplink with the first ARINC 618 label/sublabel, CMU/CMF 220 creates and sends an associated ARINC 619 uplink with the ARINC 619 destination code 'D' via a port of first ACARS end system 210, and no update is required for end system 210. If the uplink ACARS datalink message is the ARINC 618 uplink with the second ARINC 618 label/sublabel, CMU/CMF 220 creates and sends an associated ARINC 619 uplink with the ARINC 619 destination code 'D' via a port of second ACARS end system 212, and no update is required for end system 212.

When a downlink ACARS datalink message is sent, CMU/CMF 220 determines if the downlink ACARS datalink message is an ARINC 619 downlink received with the ARINC 619 origin code 'D'. If the downlink ACARS datalink message is an ARINC 619 downlink with the ARINC 619 origin code 'D', CMU/CMF 220 determines if the downlink ACARS datalink message is received from a port of first ACARS end system 210 or a port of second ACARS end system 212. If the downlink ACARS datalink message is received from the port of first ACARS end system 210, CMU/CMF 220 creates an associated ARINC 618 downlink with the appropriate label/sublabel, and then provides this to a data radio 230 for transmission to a ground station radio 240. If the downlink ACARS datalink message is received from the port of second ACARS end system 212, CMU/CMF 220 creates an associated ARINC 618 downlink with the appropriate label/sublabel, and then provides this to the data radio 230 for transmission to the ground station radio 240.

Figure 3:
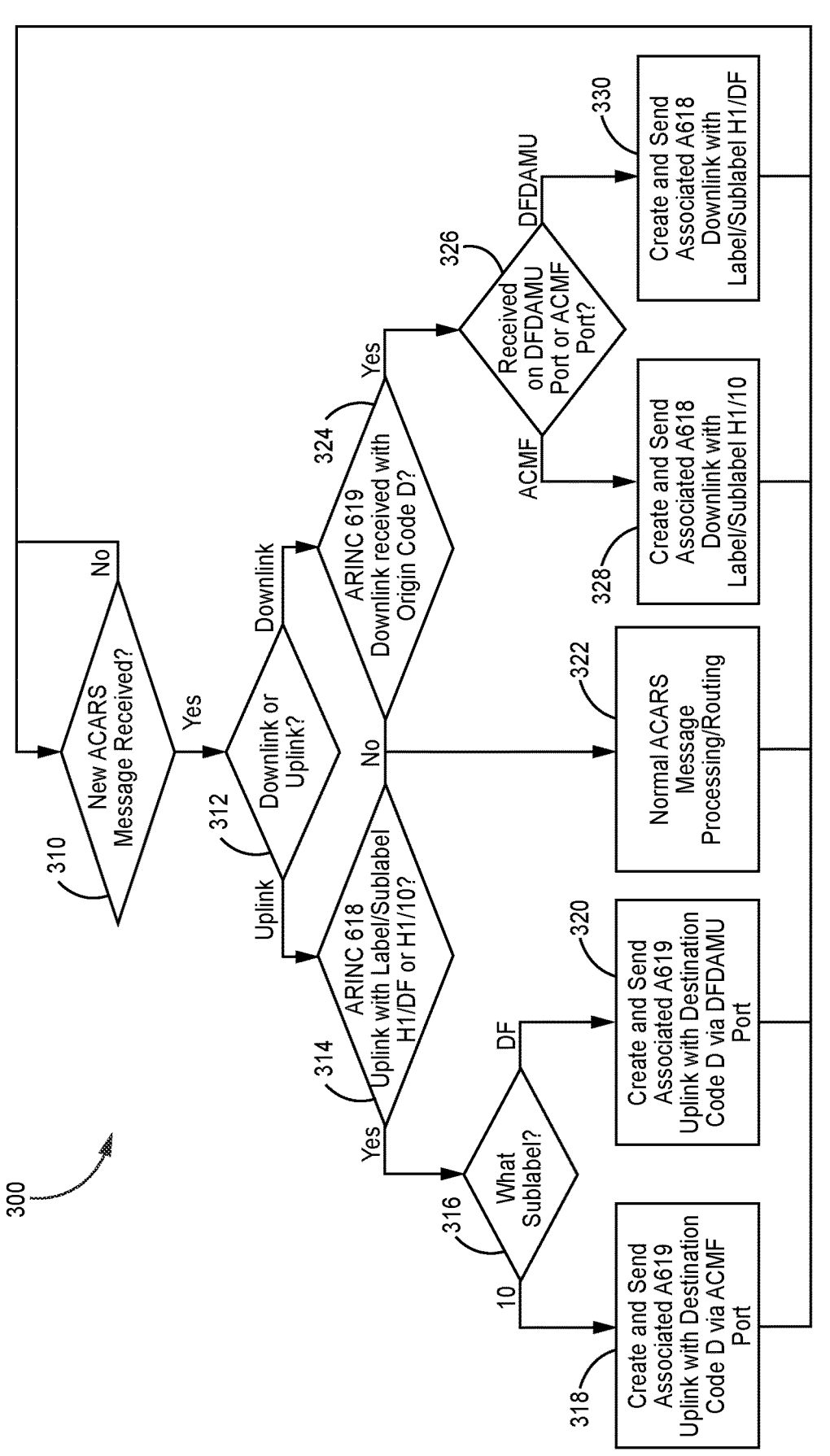
FIG. 3 is a flow diagram of a method for supporting two independent datalink end systems of the same type, accord-ing to an example implementation.

FIG. 3 is a flow diagram of a method 300 for supporting two independent datalink end systems of the same type, according to an example implementation. The method 300 would be executed in a CMC/CMF of an aircraft, for example.

The method 300 initially determines whether a new ACARS message is received (block 310). If not, method 300 continues to monitor for new ACARS messages. If a new ACARS message is received, method 300 determines whether the new ACARS message is a downlink message or an uplink message (block 312). If the new ACARS message is an uplink message, method 300 further comprises determining if the uplink message is an ARINC 618 uplink with a first label/sublabel (e.g., 'H1/DF') or a second label/sublabel (e.g., 'H1/10') (block 314). If yes, method 300 then determines the identity of the sublabel (block 316). For example, if the sublabel is identified as '10', method 300 creates and sends an associated ARINC 619 (A619) uplink with a destination code 'D' via a first end system port such as a ACMF port (block 318). The method 300 then returns to block 310 to monitor whether a new ACARS message is received. If the sublabel is identified as 'DF', method 300 creates and sends an associated ARINC 619 uplink with a destination code 'D' via a second end system port such as a DFDAMU port (block 320). The method 300 then returns to block 310 to monitor whether a new ACARS message is received.

Returning to block 314, if the uplink message is determined to not be an ARINC 618 uplink with a first label/sublabel (e.g., 'H1/DF') or a second label/sublabel (e.g., 'H1/10'), method 300 performs normal ACARS message processing and routing (block 322). The method 300 then returns to block 310 to monitor whether a new ACARS message is received.

Returning to block 312, if method 300 determines that the new ACARS message is a downlink message, method 300 further comprises determining if the downlink message is an ARINC 619 downlink received with an origin code 'D' (block 324). If yes, method 300 determines if the downlink message is received on a first end system port such as a ACMF port, or a second end system port such as a DFDAMU port (block 326). For example, if the downlink message is received on a ACMF port, method 300 creates and sends an associated ARINC 618 (A618) downlink with a first label/sublabel (e.g., 'H1/10') (block 328). The method 300 then returns to block 310 to monitor whether a new ACARS message is received. If the downlink message is received on a DFDAMU port, method 300 creates and sends an associated ARINC 618 downlink with a second label/sublabel (e.g., 'H1/DF') (block 330). The method 300 then returns to block 310 to monitor whether a new ACARS message is received.

Returning to block 324, if the downlink message is determined to not be an ARINC 619 downlink received with an origin code 'D', method 300 performs normal ACARS message processing and routing (block 322). The method 300 then returns to block 310 to monitor whether a new ACARS message is received.

Figure 4A:
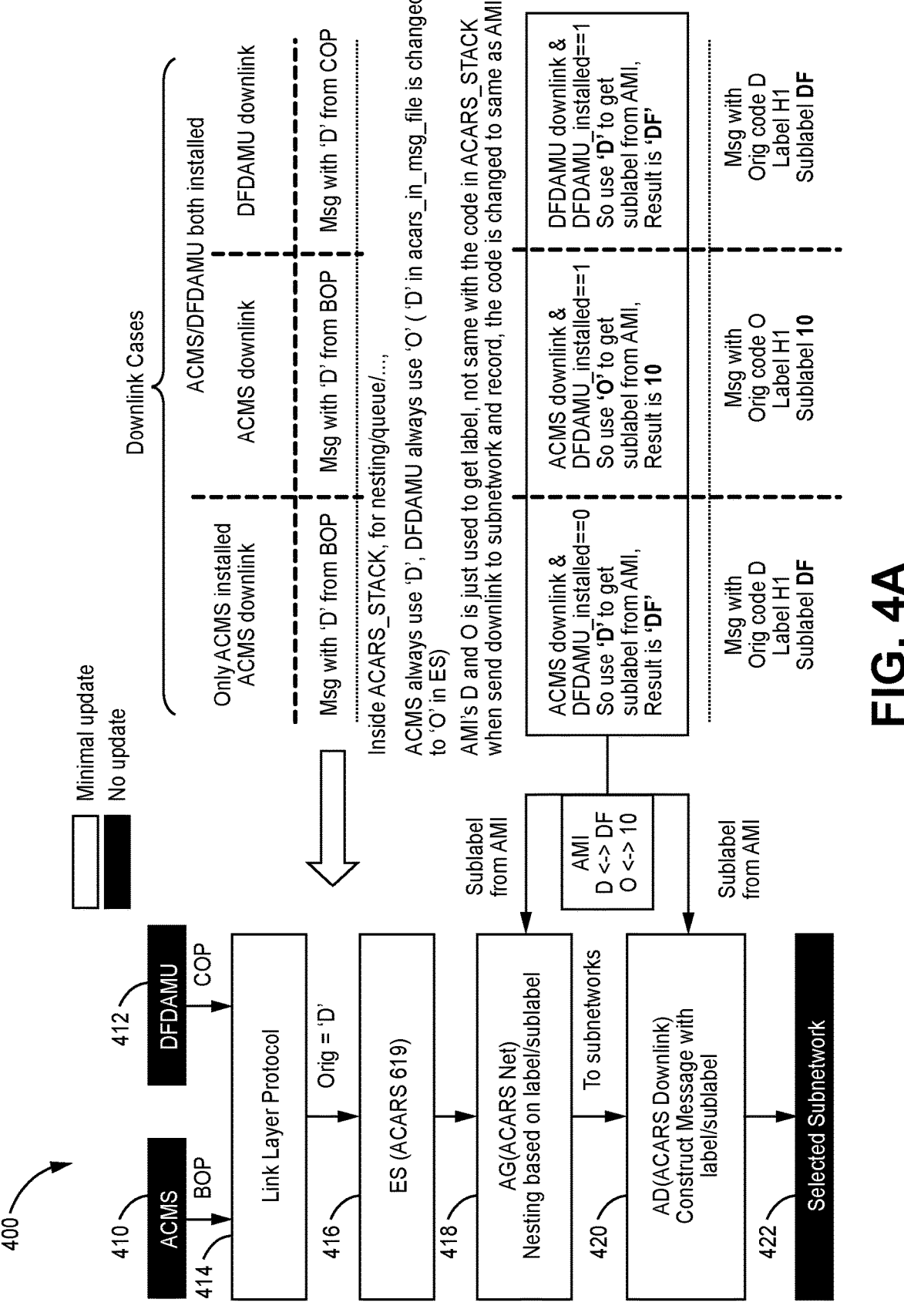
FIG. 4A is a flow diagram for an example downlink method, which can support two independent datalink end systems of the same type.

FIG. 4A is a flow diagram for an example downlink method 400, which can support two independent datalink end systems of the same type when installed, including an ACMS 410 and a DFDAMU 412, both of which require no updates. In general, a downlink message can be sent from ACMS 410 to a link layer protocol 414 using BOP (or COP), or a downlink message can be sent from DFDAMU 412 to link layer protocol 414 using COP (or BOP). The link layer protocol 414 only requires a minimal update. The downlink message is sent with an origin code 'D' from the end system using the link layer protocol 414 to an End System Source (ES) layer 416 (ACARS 619 ) in the CMU/CMF, which only requires a minimal update. The ES layer 416 in the CMU/CMF provides the message to an ACARS Ground Side Router (AG) 418 (ACARS Net) in the CMU/CMF, which includes nesting based on a label/sublabel, and only requires a minimal update. The AG 418 communicates with an ACARS downlink (AD) layer 420 in the CMU/CMF, which constructs the downlink message with a label/sublabel for transmission to a selected subnetwork 422, such as a VHF, HF, or SATCOM subnetwork. The ACARS downlink layer 420 only requires a minimal update, and selected subnetwork 422 requires no update.

In further detail for method 400, in the case when only ACMS 410 is installed as an end system with an origin/destination code of 'D', a downlink message from ACMS 410 includes a message with origin code D from BOP. For example, when there is an ACMS downlink and a DFDAMU is not installed, the origin code 'D' is used to get the sublabel from the a translation/lookup/forwarding table such as AMI, resulting in sublabel 'DF'. The donwlink message with origin code 'D', label 'H1' and sublabel 'DF', is constructed by ACARS downlink layer 420 and sent to selected subnetwork 422.

In the case when ACMS 410 and DFDAMU 412 are both installed, a downlink message from ACMS 410 includes a message with origin code D from BOP. A downlink message from DFDAMU 412 includes a message with origin code D from COP. For example, when ACMS 410 and DFDAMU 412 are both installed, the origin code 'O' can be used to get the sublabel from a translation/lookup/forwarding table such as AMI, resulting in sublabel '10'.

The message with origin code 'O', label 'H1' and sublabel '10', is constructed by ACARS downlink layer 420 and sent to selected subnetwork 422. If there is a DFDAMU downlink when DFDAMU 412 is installed, the origin code 'D' is used to get the sublabel from AMI, resulting in sublabel 'DF'. The message with origin code 'D', label 'H1', sublabel 'DF' is constructed by ACARS downlink layer 420 and sent to selected subnetwork 422.

In the downlink case examples, inside the ACARS stack, the ACMS always uses 'D' and the DFDAMU always uses 'O' ('D' in ACARS in the message file is changed to 'O' in the ES). The AMI's 'D' and 'O' is just used to get the label, which is not same with the code in the ACARS stack. When the downlink is sent to the subnetwork and recorded, the code is changed to the same as in the AMI.

Figure 4B:
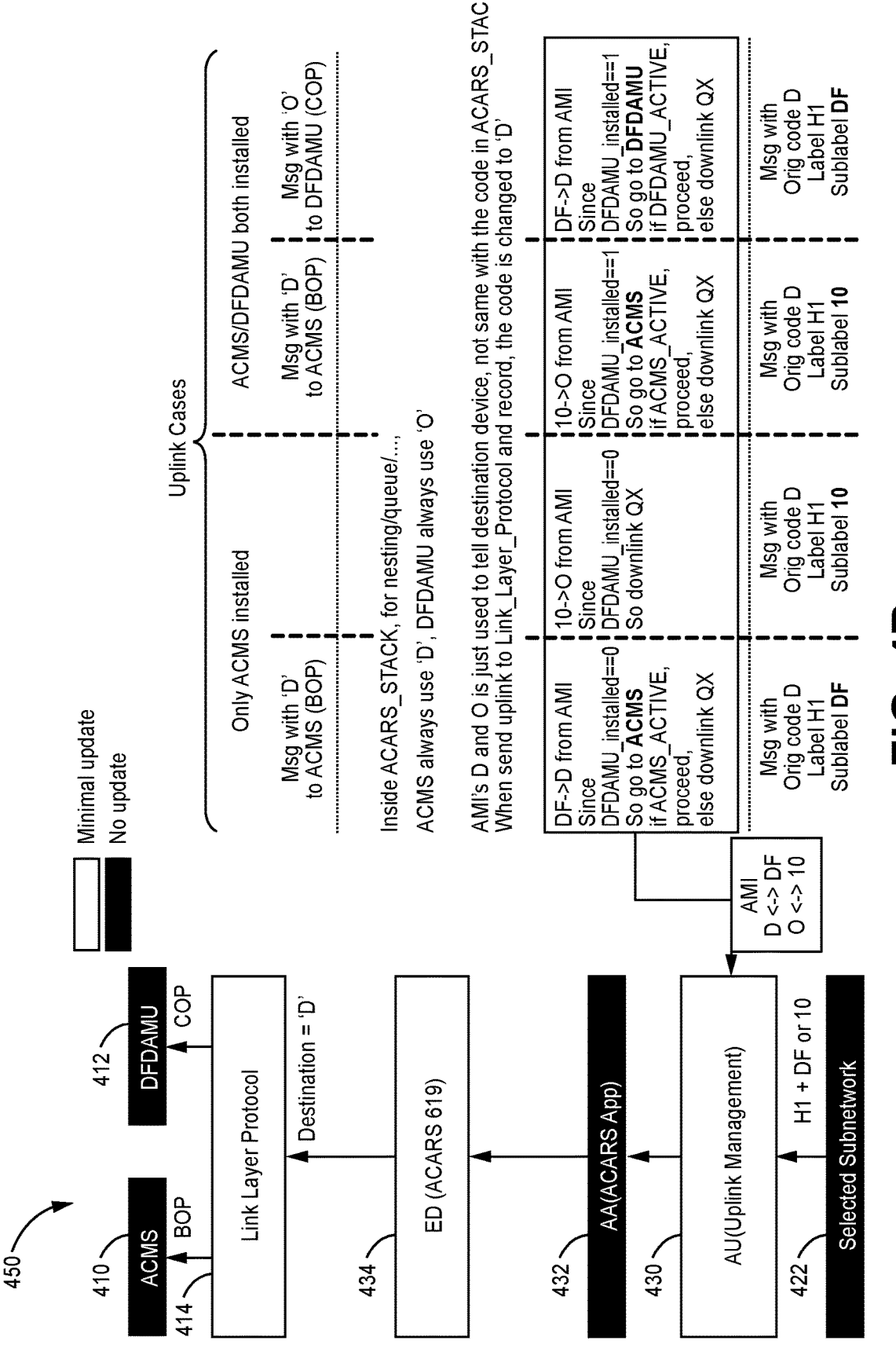
FIG. 4B is a flow diagram for an example uplink method, which can support two independent datalink end systems of the same type.

FIG. 4B is a flow diagram for an example uplink method 450, which can support two independent datalink end systems of the same type when installed, such as ACMS 410 and DFDAMU 412. In general, selected subnetwork 422 sends an uplink message with label 'H1', and sublabel 'DF' or '10', to an ACARS uplink (AU) management layer 430, which determines if the uplink message has label/sublabel 'H1/DF' or label/sublabel 'H1/10'. The AU management layer 430 only requires a minimal update, and forwards the uplink message to an ACARS application (AA) 432, which requires no update. The ACARS application 432 sends the uplink message to an End System Destination (ED) layer 434 (ACARS 619 ), which only requires a minimal update. The ED layer 434 forwards the uplink message to link layer protocol 414 using destination code 'D'. The link layer protocol 414 then sends the uplink message to ACMS 410 using BOP, or DFDAMU 412 using COP, for example.

In further detail for method 450, in the case when only ACMS 410 is installed, an uplink message with origin code 'D', label 'H1' and sublabel 'DF', can be sent from selected subnetwork 422, or an uplink message with origin code 'D', label 'H1' and sublabel '10', can be sent from selected subnetwork 422. The uplink message is received by AU management layer 430, which determines if the uplink message has label/sublabel 'H1/DF', or label/sublabel 'H1/10'. For example, if the uplink message has label/sublabel 'H1/DF', the sublabel 'DF' is mapped to destination code 'D' from AMI. Since the DFDAMU is not installed, the uplink message will be sent to the ACMS if the ACMS is active, else method 450 downlinks a rejection (QX). When the ACMS is active, the uplink message is sent with code 'D' to the ACMS using BOP, for example. If the uplink message has label/sublabel 'H1/10', the sublabel '10' is mapped to destination code 'O' from AMI, which refers to the ACMS when the DFDAMU is installed. Since the DFDAMU is not installed, method 450 downlinks QX.

In the case when both ACMS 410 and DFDAMU 412 are installed, an uplink message with label 'H1' and sublabel '10', can be sent from selected subnetwork 422, or an uplink message with label 'H1' and sublabel 'DF', can be sent from selected subnetwork 422. The uplink message is received by AU management layer 430, which determines if the uplink message has label/sublabel 'H1/10', or label/sublabel 'H1/DF'. For example, if the uplink message has label/sublabel 'H1/10', the sublabel '10' is mapped to destination code 'O' from AMI. Since the DFDAMU is installed, the message will be sent to the ACMS if the ACMS is active, else method 450 downlinks QX. When the ACMS is active, the uplink message is sent with code 'D' to the ACMS using BOP, for example. If the uplink message has label/sublabel 'H1/DF', the sublabel 'DF' is mapped to destination code 'D' from AMI. Since the DFDAMU is installed, the message will be sent to the DFDAMU if the DFDAMU is active, else method 450 downlinks QX. When the DFDAMU is active, the uplink message is sent with code 'D' to the DFDAMU using COP, for example.

In the uplink case examples, inside the ACARS stack, the ACMS always uses code 'D' and the DFDAMU always uses code 'O'. The AMI's 'D' and 'O' is just used to tell the destination device, which is not the same with the code in the ACARS stack. When the uplink message is sent to link layer protocol 414, the code is changed to 'D'.

The processing units and/or other computational devices used in systems and methods described herein may be implemented using software, firmware, hardware, or appropriate combinations thereof. The processing unit and/or other computational devices may be supplemented by, or incorporated in, specially designed application-specific integrated circuits (ASICs) or field programmable gate arrays (FPGAs). In some implementations, the processing unit and/or other computational devices may communicate through an additional transceiver with other computing devices outside of the system, such as those associated with a management system or computing devices associated with other subsystems controlled by the management system. The processing unit and/or other computational devices can also include or function with software programs, firmware, or other computer readable instructions for carrying out various process tasks, calculations, and control functions used in the methods and systems described herein.

The methods described herein may be implemented by computer executable instructions, such as program modules or components, which are executed by at least one processor or processing unit. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer readable instructions. These instructions are typically stored on appropriate computer program products that include computer readable media used for storage of computer readable instructions or data structures. Such a computer readable medium may be available media that can be accessed by a general purpose or special purpose computer or processor, or any programmable logic device.

Suitable computer readable storage media may include, for example, non-volatile memory devices including semiconductor memory devices such as Random Access Memory (RAM), Read Only Memory (ROM), Electrically Erasable Programmable ROM (EEPROM), or flash memory devices;

magnetic disks such as internal hard disks or removable disks; optical storage devices such as compact discs (CDs), digital versatile discs (DVDs), Blu-ray discs; or any other media that can be used to carry or store desired program code in the form of computer executable instructions or data structures.

EXAMPLE EMBODIMENTS

Example 1 includes a method comprising: providing at least a first ACARS end system and a second ACARS end system that share the same ARINC 619 origin code and the same ARINC 619 destination code, wherein the first ACARS end system has a first ARINC 618 label/sublabel, and the second ACARS end system has a second ARINC 618 label/sublabel that is different from the first ARINC 618 label/sublabel; when an uplink ACARS datalink message is received, determining if the uplink ACARS datalink message is an ARINC 618 uplink with the first ARINC 618 label/sublabel or the second ARINC 618 label/sublabel; if the uplink ACARS datalink message is the ARINC 618 uplink with the first ARINC 618 label/sublabel, creating and sending an associated ARINC 619 uplink with the shared ARINC 619 destination code via a port of the first ACARS end system; if the uplink ACARS datalink message is the ARINC 618 uplink with the second ARINC 618 label/sublabel, creating and sending an associated ARINC 619 uplink with the shared ARINC 619 destination code via a port of the second ACARS end system; when a downlink ACARS datalink message is received, determining if the downlink ACARS datalink message is an ARINC 619 downlink received with the shared ARINC 619 origin code; if the downlink ACARS datalink message is an ARINC 619 downlink received with the shared ARINC 619 origin code, determining if the downlink ACARS datalink message is received on a port of the first ACARS end system or a port of the second ACARS end system; if the downlink ACARS datalink message is received on the port of the first ACARS end system, creating and sending an associated ARINC 618 downlink with the first ARINC 618 label/sublabel; if the downlink ACARS datalink message is received on the port of the second ACARS end system, creating and sending an associated ARINC 618 downlink with the second ARINC 618 label/sublabel.

Example 2 includes the method of Example 1, wherein if the uplink ACARS datalink message is not an ARINC 618 uplink with the first ARINC 618 label/sublabel or the second ARINC 618 label/sublabel, performing standard ACARS message processing and routing.

Example 3 includes the method of Example 1, wherein if the downlink ACARS datalink message is not an ARINC 619 downlink received with the shared ARINC 619 origin code for the first and second ACARS end systems, performing standard ACARS message processing and routing.

Example 4 includes the method of any of Examples 1-3, wherein the first ACARS end system comprises an aircraft condition monitoring system (ACMS), and the second ACARS end system comprises a digital flight data acquisition management unit (DFDAMU).

Example 5 includes the method of any of Examples 1-4, wherein the first and second ACARS end systems comprise one or more central maintenance computers, ACMS systems, electronic flight bags, cabin terminals, flight management computers, or combinations thereof.

Example 6 includes the method of any of Examples 1-5, wherein the first and second ACARS end systems operatively communicate with a communication management function (CMF) or a communication management unit (CMU), in an aircraft.

Example 7 includes the method of Example 6, wherein the CMF or the CMU operatively communicate with one or more data radios in the aircraft.

Example 8 includes the method of Example 7, wherein the one or more data radios in the aircraft operatively communicate with one or more ground station radios.

Example 9 includes a system comprising: at least a first ACARS end system and a second ACARS end system that are each onboard an aircraft, wherein the first ACARS end system and the second ACARS end system share the same ARINC 619 origin code and the same ARINC 619 destination code, wherein the first ACARS end system has a first ARINC 618 label/sublabel, and the second ACARS end system has a second ARINC 618 label/sublabel that is different from the first ARINC 618 label/sublabel; an onboard communications management unit (CMU) or communications management function (CMF) in operative communication with the first and second ACARS end systems; and one or more onboard data radios that operatively communicate with the CMU or the CMF; wherein when an uplink ACARS datalink message is received by the one or more data radios from one or more ground station radios, the CMU or the CMF is operative to perform a method comprising: determining if the uplink ACARS datalink message is an ARINC 618 uplink with the first ARINC 618 label/sublabel or the second ARINC 618 label/sublabel; if the uplink ACARS datalink message is the ARINC 618 uplink with the first ARINC 618 label/sublabel, creating and sending an associated ARINC 619 uplink with the shared ARINC 619 destination code via a port of the first ACARS end system; if the uplink ACARS datalink message is the ARINC 618 uplink with the second ARINC 618 label/sublabel, creating and sending an associated ARINC 619 uplink with the shared ARINC 619 destination code via a port of the second ACARS end system; wherein when a downlink ACARS datalink message is sent from the first ACARS end system or the second ACARS end system, the CMU or the CMF is operative to perform a method comprising: determining if the downlink ACARS datalink message is an ARINC 619 downlink received with the shared ARINC 619 origin code; if the downlink ACARS datalink message is an ARINC 619 downlink received with the shared ARINC 619 origin code, determining if the downlink ACARS datalink message is received on a port of the first ACARS end system or a port of the second ACARS end system; if the downlink ACARS datalink message is received on the port of the first ACARS end system, creating and sending an associated ARINC 618 downlink with the first ARINC 618 label/sublabel; if the downlink ACARS datalink message is received on the port of the second ACARS end system, creating and sending an associated ARINC 618 downlink with the second ARINC 618 label/sublabel.

Example 10 includes the system of Example 9, wherein the first ACARS end system comprises an aircraft condition monitoring system (ACMS), and the second ACARS end system comprises a digital flight data acquisition management unit (DFDAMU).

Example 11 includes the system of any of Examples 9-10, wherein the first and second ACARS end systems comprise one or more central maintenance computers, ACMS systems, electronic flight bags, cabin terminals, flight management computers, or combinations thereof.

Example 12 includes the system of any of Examples 9-11, wherein the one or more onboard data radios in the aircraft comprise a very high frequency (VHF) data radio, a satellite communications (SATCOM) data radio, a high frequency (HF) data radio, or an ACARS over internet protocol (IP) subnetwork.

Example 13 includes the system of any of Examples 9-12, wherein the one or more ground station radios are in operative communication with a datalink service provider.

Example 14 includes the system of Example 13, wherein the datalink service provider is in operative communication with a ground end system.

Example 15 includes the system of Example 14, wherein the ground end system comprises an airline operations center, or air traffic control.

Example 16 includes a method comprising: determining whether a new ACARS message is received; if a new ACARS message is received, determining if the ACARS message is an uplink message or a downlink message; wherein if the ACARS message is an uplink message, the method further comprising: determining if the uplink message is an ARINC 618 uplink with a first label/sublabel or a second label/sublabel; if the uplink message is an ARINC 618 uplink with the first label/sublabel or the second label/sublabel, determining the identity of the sublabel; if the sublabel is from the first label/sublabel, creating and sending an associated ARINC 619 uplink with a shared destination code via a first end system port; if the sublabel is from the second label/sublabel, creating and sending an associated ARINC 619 uplink with the shared destination code via a second end system port; wherein if the ACARS message is a downlink message, the method further comprising: determining if the downlink message is an ARINC 619 downlink received with a shared origin code; if the downlink message is an ARINC 619 downlink received with the shared origin code, determining if the downlink message is received on a first end system port or a second end system port; if the downlink message is received on the first end system port, creating and sending an associated ARINC 618 downlink with a first label/sublabel; if the downlink message is received on the second end system port, creating and sending an associated ARINC 618 downlink with a second label/sublabel.

Example 17 includes the method of Example 16, wherein if the uplink message is not an ARINC 618 uplink with the first label/sublabel or the second label/sublabel, performing normal ACARS message processing and routing.

Example 18 includes the method of Example 16, wherein if the downlink message is not an ARINC 619 downlink received with a shared origin code, performing normal ACARS message processing and routing.

Example 19 includes the method of any of Examples 16-18, wherein the first end system port is associated with a first ACARS end system onboard an aircraft, and the second end system port is associated with a second ACARS end system onboard the aircraft and of the same end system type as the first ACARS end system.

Example 20 includes the method of Example 19, wherein the first and second ACARS end systems comprise one or more of an aircraft condition monitoring system (ACMS), a digital flight data acquisition management unit (DFDAMU), central maintenance computers, electronic flight bags, cabin terminals, flight management computers, or combinations thereof.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A method comprising:

providing at least a first ACARS end system and a second ACARS end system that share the same ARINC 619 origin code and the same ARINC 619 destination code, wherein the first ACARS end system has a first ARINC 618 label/sublabel, and the second ACARS end system has a second ARINC 618 label/sublabel that is different from the first ARINC 618 label/sublabel;

when an uplink ACARS datalink message is received, determining if the uplink ACARS datalink message is an ARINC 618 uplink with the first ARINC 618 label/sublabel or the second ARINC 618 label/sublabel;

if the uplink ACARS datalink message is the ARINC 618 uplink with the first ARINC 618 label/sublabel, creating and sending an associated ARINC 619 uplink with the shared ARINC 619 destination code via a port of the first ACARS end system;

if the uplink ACARS datalink message is the ARINC 618 uplink with the second ARINC 618 label/sublabel, creating and sending an associated ARINC 619 uplink with the shared ARINC 619 destination code via a port of the second ACARS end system;

when a downlink ACARS datalink message is received, determining if the downlink ACARS datalink message is an ARINC 619 downlink received with the shared ARINC 619 origin code;

if the downlink ACARS datalink message is an ARINC 619 downlink received with the shared ARING 619 origin code, determining if the downlink ACARS datalink message is received on a port of the first ACARS end system or a port of the second ACARS end system;

if the downlink ACARS datalink message is received on the port of the first ACARS end system, creating and sending an associated ARINC 618 downlink with the first ARINC 618 label/sublabel;

if the downlink ACARS datalink message is received on the port of the second ACARS end system, creating and sending an associated ARINC 618 downlink with the second ARINC 618 label/sublabel.

2. The method of claim 1, wherein if the uplink ACARS datalink message is not an ARINC 618 uplink with the first ARING 618 label/sublabel or the second ARINC 618 label/sublabel, performing standard ACARS message processing and routing.

3. The method of claim 1, wherein if the downlink ACARS datalink message is not an ARINC 619 downlink received with the shared ARINC 619 origin code for the first and second ACARS end systems, performing standard ACARS message processing and routing.

4. The method of claim 1, wherein the first ACARS end system comprises an aircraft condition monitoring system (ACMS), and the second ACARS end system comprises a digital flight data acquisition management unit (DFDAMU).

5. The method of claim 1, wherein the first and second ACARS end systems comprise one or more central maintenance computers, ACMS systems, electronic flight bags, cabin terminals, flight management computers, or combinations thereof.

6. The method of claim 1, wherein the first and second ACARS end systems operatively communicate with a communication management function (CMF) or a communication management unit (CMU), in an aircraft.

7. The method of claim 6, wherein the CMF or the CMU operatively communicate with one or more data radios in the aircraft.

8. The method of claim 7, wherein the one or more data radios in the aircraft operatively communicate with one or more ground station radios.

9. A system comprising:

at least a first ACARS end system and a second ACARS end system that are each onboard an aircraft, wherein the first ACARS end system and the second ACARS end system share the same ARINC 619 origin code and the same ARINC 619 destination code, wherein the first ACARS end system has a first ARINC 618 label/sublabel, and the second ACARS end system has a second ARINC 618 label/sublabel that is different from the first ARINC 618 label/sublabel;

an onboard communications management unit (CMU) or communications management function (CMF) in operative communication with the first and second ACARS end systems; and one or more onboard data radios that operatively communicate with the CMU or the CMF;

wherein when an uplink ACARS datalink message is received by the one or more data radios from one or more ground station radios, the CMU or the CMF is operative to perform a method comprising:

determining if the uplink ACARS datalink message is an ARINC 618 uplink with the first ARINC 618 label/sublabel or the second ARINC 618 label/sublabel;

if the uplink ACARS datalink message is the ARINC 618 uplink with the first ARINC 618 label/sublabel, creating and sending an associated ARINC 619 uplink with the shared ARINC 619 destination code via a port of the first ACARS end system;

if the uplink ACARS datalink message is the ARINC 618 uplink with the second ARING 618 label/sublabel, creating and sending an associated ARINC 619 uplink with the shared ARING 619 destination code via a port of the second ACARS end system;

wherein when a downlink ACARS datalink message is sent from the first ACARS end system or the second ACARS end system, the CMU or the CMF is operative to perform a method comprising:

determining if the downlink ACARS datalink message is an ARINC 619 downlink received with the shared ARINC 619 origin code;

if the downlink ACARS datalink message is an ARINC 619 downlink received with the shared ARINC 619 origin code, determining if the downlink ACARS datalink message is received on a port of the first ACARS end system or a port of the second ACARS end system;

if the downlink ACARS datalink message is received on the port of the first ACARS end system, creating and sending an associated ARINC 618 downlink with the first ARINC 618 label/sublabel;

if the downlink ACARS datalink message is received on the port of the second ACARS end system, creating and sending an associated ARINC 618 downlink with the second ARINC 618 label/sublabel.

10. The system of claim 9, wherein the first ACARS end system comprises an aircraft condition monitoring system (ACMS), and the second ACARS end system comprises a digital flight data acquisition management unit (DFDAMU).

11. The system of claim 9, wherein the first and second ACARS end systems comprise one or more central maintenance computers, ACMS systems, electronic flight bags, cabin terminals, flight management computers, or combinations thereof.

12. The system of claim 9, wherein the one or more onboard data radios in the aircraft comprise a very high frequency (VHF) data radio, a satellite communications (SATCOM) data radio, a high frequency (HF) data radio, or an ACARS over internet protocol (IP) subnetwork.

13. The system of claim 9, wherein the one or more ground station radios are in operative communication with a datalink service provider.

14. The system of claim 13, wherein the datalink service provider is in operative communication with a ground end system.

15. The system of claim 14, wherein the ground end system comprises an airline operations center, or air traffic control.

16. A method comprising:

receiving an ACARS message;

determining whether the ACARS message is an uplink message or a downlink message;

wherein when the ACARS message is an uplink message, the method further comprising:

determining if the uplink message is an ARINC 618 uplink with a first label/sublabel or a second label/sublabel;

when the uplink message is an ARINC 618 uplink with the first label/sublabel or the second label/sublabel, determining the identity of the sublabel;

if the sublabel is from the first label/sublabel, creating and sending an associated ARINC 619 uplink with a shared destination code via a first end system port;

if the sublabel is from the second label/sublabel, creating and sending an associated ARINC 619 uplink with the shared destination code via a second end system port;

wherein when the ACARS message is a downlink message, the method further comprising:

determining if the downlink message is an ARINC 619 downlink received with a shared origin code;

when the downlink message is an ARINC 619 downlink received with the shared origin code, determining if the downlink message is received on a first end system port or a second end system port;

if the downlink message is received on the first end system port, creating and sending an associated ARINC 618 downlink with a first label/sublabel;

if the downlink message is received on the second end system port, creating and sending an associated ARINC 618 downlink with a second label/sublabel.

17. The method of claim 16, wherein if the uplink message is not an ARINC 618 uplink with the first label/sublabel or the second label/sublabel, performing normal ACARS message processing and routing.

18. The method of claim 16, wherein if the downlink message is not an ARINC 619 downlink received with a shared origin code, performing normal ACARS message processing and routing.

19. The method of claim 16, wherein the first end system port is associated with a first ACARS end system onboard an aircraft, and the second end system port is associated with a second ACARS end system onboard the aircraft and of the same end system type as the first ACARS end system.

20. The method of claim 19, wherein the first and second ACARS end systems comprise one or more of an aircraft condition monitoring system (ACMS), a digital flight data acquisition management unit (DFDAMU), central maintenance computers, electronic flight bags, cabin terminals, flight management computers, or combinations thereof.

* * * * *